United States Patent [19]
Wisz

[11] 4,136,806
[45] Jan. 30, 1979

[54] OUTBOARD MOTOR CARRIER

[76] Inventor: Adam Wisz, 2231 W. 60th Dr., Merrillville, Ind. 46410

[21] Appl. No.: 858,695

[22] Filed: Dec. 8, 1977

[51] Int. Cl.² .............................................. B60R 9/08
[52] U.S. Cl. ........................ 224/42.45 R; 224/42.03 R
[58] Field of Search ....... 224/42.45 R, 29 R, 42.03 R, 224/42.03 B, 42.1 H, 42.46 R, 42.43, 42.44; 214/450

[56] References Cited

U.S. PATENT DOCUMENTS

| 2,592,050 | 4/1952 | McCharen | 224/42.03 R |
| 2,772,799 | 12/1956 | Bridinger | 214/450 |
| 2,892,555 | 6/1959 | Hooker | 254/139.1 X |
| 3,229,874 | 1/1966 | Schneider et al. | 224/42.03 B |
| 3,777,922 | 12/1973 | Kirchmeyer | 214/450 |

Primary Examiner—Trygve M. Blix
Assistant Examiner—Jerold M. Forsberg
Attorney, Agent, or Firm—Daniel Jay Tick

[57] ABSTRACT

A vertically extending support post is affixed to a support member extending from the chassis of an automotive vehicle beyond the rear of the body. A flattened elongated ring is affixed to a square U-shaped bracket which is affixed to the support post in an area intermediate its top and bottom. The ring extends horizontally. A board-like motor support member is affixed to the bracket. The motor support member supports an outboard motor mounted thereon.

1 Claim, 6 Drawing Figures

OUTBOARD MOTOR CARRIER

BACKGROUND OF THE INVENTION

The present invention relates to an outboard motor carrier. More particularly, the invention relates to an outboard motor carrier for an automotive vehicle having a chassis and a body mounted on the chassis and having a top and a rear.

Outboard motor carriers are described in the following U.S. patents. U.S. Pat. No. 2,247,128, issued to Levey on June 24, 1941, U.S. Pat. No. 2,663,474, issued to Kelly on Dec. 22, 1953, U.S. Pat. No. 2,762,542, issued to Hodgeman on Sept. 11, 1956, U.S. Pat. No. 2,887,237, issued to Ellingson on May 19, 1959, U.S. Pat. No. 2,895,628, issued to Gebhart on July 21, 1959 and U.S. Pat. No. 3,039,634, issued to Hobson et al on June 19, 1962.

Objects of the invention are to provide an outboard motor carrier of simple structure, which is inexpensive in manufacture, installed with facility and convenience on new and existing automotive vehicles, used with facility and convenience, and functions efficiently, effectively and reliably to releasably securely mount an outboard motor for transportation, as desired.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
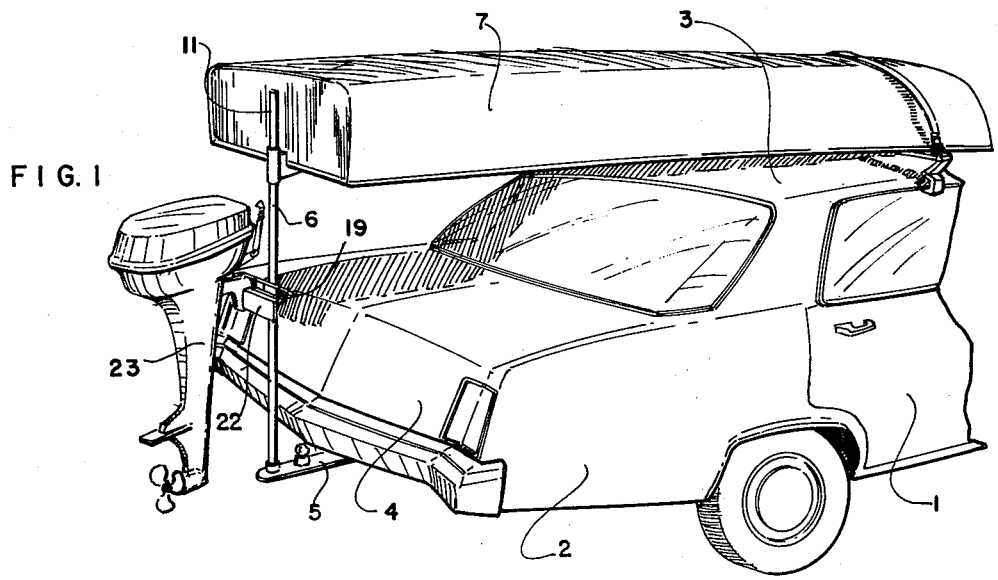
FIG. 1 is a perspective view of an embodiment of the outboard motor carrier of the invention.

The outboard motor carrier of the invention is for an automotive vehicle 1 having a chassis (not shown in the FIGS.) and a body 2 mounted on the chassis and having a top 3 and a rear 4, as shown in FIG. 1.

The outboard motor carrier of the invention comprises a support member 5 affixed to the chassis of the vehicle and extending substantially horizontally beyond the rear 4 of the body 2.

A support post 6 is mounted on the support member 5 beyond the rear of the body of the vehicle and extends substantially vertically beyond the top 3 of the vehicle for supporting a boat 7 resting on said top, as shown in FIG. 1.

Figure 6:
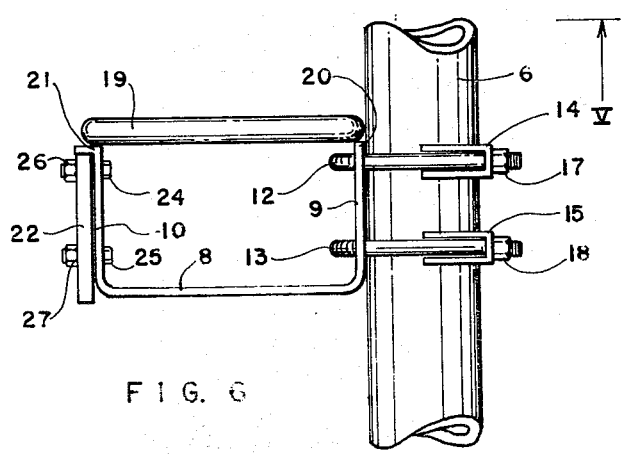
FIG. 6 is a view, on an enlarged scale, taken along the lines VI—VI, of FIG. 4.

A substantially square U-shaped bracket 8 (FIGS. 2 and 4 to 6) has first and second spaced parallel arms 9 and 10, respectively (FIG. 6).

Figure 2:
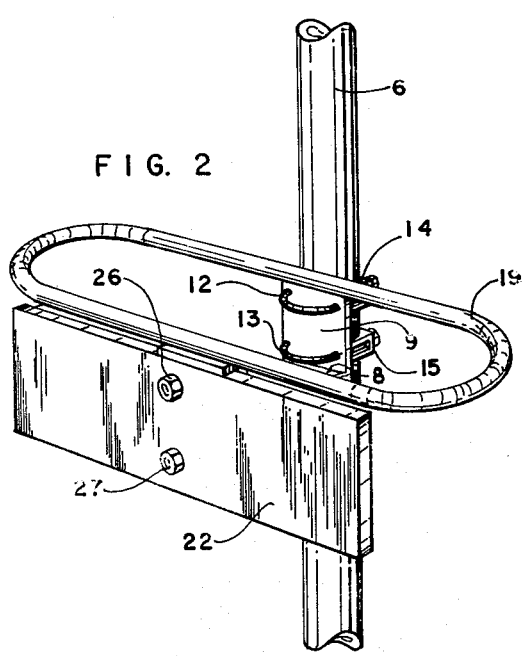
FIG. 2 is a perspective view, on an enlarged scale, of the key parts of the embodiment of FIG. 1.
Figure 4:
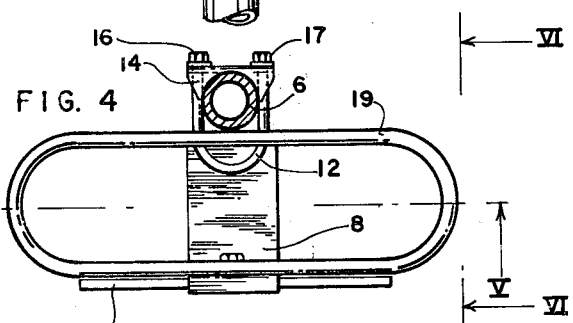
FIG. 4 is a view, taken along the lines IV—IV, of FIG. 3.
Figure 5:
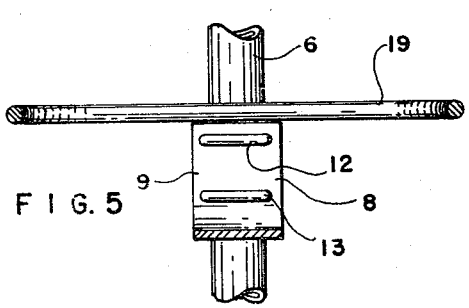
FIG. 5 is a view, partly in section, taken along the lines V—V, of FIG. 4.

The first arm 9 of the bracket 8 is affixed to the support post 6 in substantial juxtaposition therewith at an area intermediate the support member 5 and the top 11 of said support post, so that the second arm 10 of said bracket extends rearward of said support post, as shown in FIGS. 2, 4 and 6. The first arm 9 is affixed to the support post 6 via a pair of U-shaped fastening bolts 12 and 13 passing through bores formed through said arm and extending beyond said arm to straddle the support post (FIGS. 2, 5 and 6).

The free ends of the U-shaped bolts 12 and 13 are externally threaded and clamping members 14 and 15 are fitted over said free ends and snugly against the support post 6, as shown in FIGS. 2 and 6, and are held in position by nuts 16 and 17, affixed to the free ends of the U-shaped bolt 12 (FIG. 4) and a pair of nuts, of which one nut 18 is shown in FIG. 6, affixed to the free ends of the U-shaped bolt 13.

A flattened elongated ring 19 is affixed to the free ends 20 and 21 of the first and second arms 9 and 10, respectively (FIG. 6) of the bracket 8 and extends substantially horizontally, as shown in the FIGS.

Figure 3:
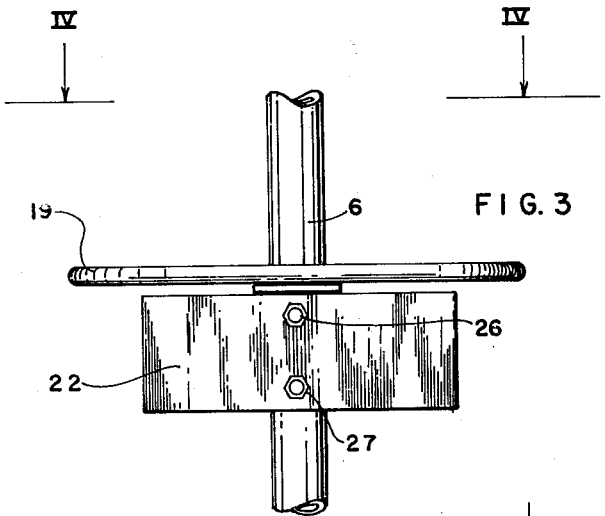
FIG. 3 is a rear view, on an enlarged scale, of the key parts of the embodiment of FIG. 1.

A board-like motor support member 22 (FIGS. 1 to 4 and 6) is affixed to the second arm 10 of the bracket 8 and extends substantially vertically from the ring 19 and beneath said ring for supporting an outboard motor 23 mounted thereon, in the same manner as the motor would be mounted on a boat, as shown in FIG. 1. The motor support member 22 is affixed to the second arm 10 of the bracket 8 via a pair of bolts 24 and 25 (FIG. 6) extending through holes bored through said arm and said motor support member and secured by nuts 26 and 27, respectively, as shown in FIGS. 2, 3 and 6.

While the invention has been described by means of a specific example and in a specific embodiment, I do not wish to be limited thereto, for obvious modifications will occur to those skilled in the art without departing from the spirit and scope of the invention.

I claim:

1. An outboard motor carrier for an automotive vehicle having a chassis and a body mounted on the chassis and having a top and a rear, said outboard motor carrier comprising a support member affixed to the chassis of an automotive vehicle and extending substantially horizontally beyond the rear of the body;

a support post mounted on the support member beyond the rear of the body of the vehicle and extending substantially vertically beyond the top of the vehicle for supporting a boat resting on said top;

a substantially square U-shaped bracket having first and second spaced parallel arms;

fastening means affixing the first arm of the bracket to the support post in substantial juxtaposition therewith at an area intermediate the support member and the top, the second arm of said bracket extending rearward of said support post;

a flattened elongated ring affixed to the free ends of the first and second arms of said bracket and extending substantially horizontally; and a board-like motor support member affixed to the second arm of said bracket and extending substantially vertically from said ring for supporting an outboard motor mounted thereon.

* * * * *